US009644549B2

(12) United States Patent
Saito

(10) Patent No.: US 9,644,549 B2
(45) Date of Patent: May 9, 2017

(54) CONTROL APPARATUS FOR INTERNAL COMBUSTION ENGINE

(71) Applicant: Toyota Jidosha Kabushiki Kaisha, Toyota-shi, Aichi-ken (JP)

(72) Inventor: Yusuke Saito, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 109 days.

(21) Appl. No.: 14/726,872

(22) Filed: Jun. 1, 2015

(65) Prior Publication Data

US 2016/0003175 A1 Jan. 7, 2016

(30) Foreign Application Priority Data

Jul. 7, 2014 (JP) .................. 2014-139503

(51) Int. Cl.
*F02D 41/00* (2006.01)
*F02D 41/14* (2006.01)
*F02B 37/18* (2006.01)

(52) U.S. Cl.
CPC ..... *F02D 41/0007* (2013.01); *F02D 41/1475* (2013.01); *F02B 37/18* (2013.01); *F02D 2200/1002* (2013.01); *F02D 2200/1004* (2013.01); *Y02T 10/144* (2013.01)

(58) Field of Classification Search
CPC ............. F02D 41/0007; F02D 41/1475; F02D 2200/1002; F02D 2200/1004; F02B 37/18; Y02T 10/144
See application file for complete search history.

(56) References Cited

U.S. PATENT DOCUMENTS

| 5,964,200 A * | 10/1999 | Shimada | ................. F02D 37/02 123/305 |
| 6,532,932 B1 * | 3/2003 | Strauss | ................. F02B 61/045 123/295 |
| 2004/0168655 A1 * | 9/2004 | Hitomi | .................... F01L 1/185 123/58.8 |

FOREIGN PATENT DOCUMENTS

JP 08-177569 7/1996

\* cited by examiner

*Primary Examiner* — Audrey K Bradley
(74) *Attorney, Agent, or Firm* — Dinsmore & Shohl LLP

(57) ABSTRACT

When engine is in the lean operation, and a WGV is fully closed, a boundary between a stoichiometric region and a lean region is corrected by learning using a turbocharging pressure obtained from a turbocharging pressure sensor. When the engine is in the lean operation, and the WGV is fully closed, the turbocharging pressure obtained from the turbocharging pressure sensor is equal to the actual maximum value of the engine torque output when a throttle valve is fully opened and the engine is in the lean operation, that is, the turbocharging pressure required to achieve the torque on the actual boundary. Therefore, the boundary can be brought close to the actual boundary by learning using the turbocharging pressure obtained from the turbocharging pressure sensor when the engine is in the lean operation and the WGV is fully closed.

4 Claims, 6 Drawing Sheets

CONTROL APPARATUS FOR INTERNAL COMBUSTION ENGINE

BACKGROUND

Field of the Application

The present invention generally relates to a control apparatus for an internal combustion engine. In particular, it relates to a control apparatus for an internal combustion engine provided with a turbocharger.

Background Art

Japanese Patent Laid-Open No. 8-177569 (Patent Literature 1) discloses a control apparatus for an internal combustion engine that switches an operation mode between a stoichiometric operation in which fuel combustion occurs at an air-fuel ratio close to a theoretical air-fuel ratio and a lean operation in which fuel combustion occurs at an air-fuel ratio leaner than the theoretical air-fuel ratio, the controller being designed to change a reference value for switching the operation mode between the stoichiometric operation and the lean operation depending on various conditions such as the inclination of the road surface on which the vehicle is running and environmental conditions. During gentle slope climbing or low-altitude driving, this controller raises the reference value to achieve the maximum torque in the lean operation and can thereby improve fuel consumption. During steep slope climbing or high-altitude driving, this controller lowers the reference value in preparation for an increase of the torque and can thereby improve drivability.

Switching between the stoichiometric operation and the lean operation is performed based on an operation region map that defines a region in which the stoichiometric operation occurs (referred to as a stoichiometric region hereinafter) and a region in which the lean operation occurs (referred to as a lean region hereinafter). The operation region map is set in advance by adaptation or the like. In the operation region map, the boundary between the stoichiometric region and the lean region is set based on the maximum value of the engine torque output when the internal combustion engine is in the lean operation with the throttle fully opened (referred to as a maximum torque value hereinafter).

In general, the maximum torque value is controlled by the amount of air taken in by the internal combustion engine when the throttle is fully opened (referred to as a WOT air amount hereinafter). However, if the WOT air amount decreases because of deposit formation on the throttle valve, the intake valve or the like or the back pressure increases because of plugging of an exhaust catalyst, the maximum torque value decreases. In this regard, if the internal combustion engine is provided with a turbocharger, the WOT air amount may further decrease because of deposit formation on the compressor, and the turbocharging efficiency can decrease because of various factors. Thus, with the internal combustion engine provided with a turbocharger, the maximum torque value is more likely to decrease than a non-turbocharged internal combustion engine.

If the maximum torque value decreases, the stoichiometric operation is needed to achieve the torque in a part of the lean region in the preset operation region map. However, since the boundary is fixed, an operation region occurs between the boundary and the reduced maximum torque value in which the engine torque does not increase even if the accelerator pedal is further pressed down. If such an operation region occurs, the acceleration demanded by the driver cannot be achieved, and the drivability can deteriorate.

SUMMARY

The present invention is devised in order to address the problem described above. More specifically, an object of the present invention is to provide a novel technique of correcting a boundary between a stoichiometric region and a lean region in an internal combustion engine provided with a turbocharger that switches an operation mode between a stoichiometric operation and a lean operation.

According to a third aspect of the present invention, a control apparatus for an internal combustion engine provided with a turbocharger is provided. The internal combustion engine switches operation of the internal combustion engine between a stoichiometric operation, in which fuel combustion occurs at an air-fuel ratio close to a theoretical air-fuel ratio, and a lean operation, in which fuel combustion occurs at an air-fuel ratio leaner than the theoretical air-fuel ratio, based on an operation region map. The operation map defines, in association with the engine torque, a stoichiometric region in which the stoichiometric operation occurs and a lean region separated from the stoichiometric region by a predetermined boundary in which the lean operation occurs, and on a target value of an engine torque. The controller includes: storage means that stores a rule that defines a relationship between a turbocharging pressure and the engine torque; a control valve that opens and closes a bypass channel that bypasses an exhaust turbine of the turbocharger; turbocharging pressure detecting means that detects the turbocharging pressure of the turbocharger; and boundary correcting means. The boundary correcting means corrects the predetermined boundary based on the engine torque calculated using the turbocharging pressure detected by the turbocharging pressure detecting means and the rule when a predetermined correction permission condition is satisfied that an operation region identified based on the target value calculated from an accelerator opening and the operation region map lies in the lean region, and the bypass channel is closed by the control valve.

According to a second aspect of the present invention, the control apparatus for an internal combustion engine according to the first aspect, may further include: intake air amount detecting means that detects an intake air amount. In the second aspect, the storage means may store a turbocharging pressure map that defines a relationship between the intake air amount and the turbocharging pressure, and the boundary correcting means may correct the predetermined boundary to the side of the lean region based on the calculated engine torque when the predetermined correction permission condition is satisfied, and the turbocharging pressure detected by the turbocharging pressure detecting means is lower than the turbocharging pressure calculated using the intake air amount detected by the intake air amount detecting means and the turbocharging pressure map.

According to a third aspect of the present invention, a control apparatus for an internal combustion engine provided with a turbocharger may be provided. The control apparatus includes: a control valve configured to open and close a bypass channel that bypasses an exhaust turbine of the turbocharger; means configured to detect turbocharging pressure of the turbocharger; and a controller. The controller is programmed to: (i) store an operation region map that defines, in association with the engine torque, a stoichiometric region in which a stoichiometric operation occurs, a lean region in which a lean operation occurs, and a predetermined boundary separating the lean region from the stoichiometric region, the stoichiometric operation being an operation in which fuel combustion occurs at an air-fuel ratio close to a theoretical air-fuel ratio, the lean operation being an operation in which fuel combustion occurs at an air-fuel ratio leaner than the theoretical air-fuel ratio, (ii) switch operation of the internal combustion engine between the stoichiometric operation and the lean operation based on the map and on a target value of an engine torque, (iii) store a rule that defines a relationship between the turbocharging pressure and the engine torque, and (iv) correct the predetermined boundary based on the engine torque calculated using the turbocharging pressure and the rule when a predetermined correction permission condition is satisfied that an operation region identified based on the target value calculated from an accelerator opening and the operation region map lies in the lean region, and the bypass channel is closed by the control valve.

According to a fourth aspect of the present invention, the control apparatus according to the third aspect, may further include means configured to detect an intake air amount. In the second aspect, the controller may be programmed to: (v) store a turbocharging pressure map that defines a relationship between an intake air amount and the turbocharging pressure, and (vi) correct the predetermined boundary to the side of the lean region based on the calculated engine torque when the predetermined correction permission condition is satisfied, and the turbocharging pressure is lower than the turbocharging pressure calculated using the detected intake air amount and the turbocharging pressure map.

According to the first and the third aspects of the present invention, when a predetermined correction permission condition is satisfied, the predetermined boundary between the stoichiometric region and the lean region can be corrected. Therefore, deterioration of the drivability due to a decrease of a maximum torque value can be satisfactorily prevented.

According to the second and fourth aspects of the present invention, whether the maximum torque value has decreased or not can be simply determined by using a turbocharging pressure map. Therefore, the predetermined boundary can be corrected at an appropriate time.

BRIEF DESCRIPTION OF THE DRAWINGS

FIG. 4A shows a map that defines a relationship between the engine speed NE and valve opening time INVT and the value a;

DETAILED DESCRIPTION OF THE EMBODIMENTS

In the following, an embodiment of the present invention will be described with reference to the drawings. The embodiment described below is not intended to limit the present invention.

Figure 1:
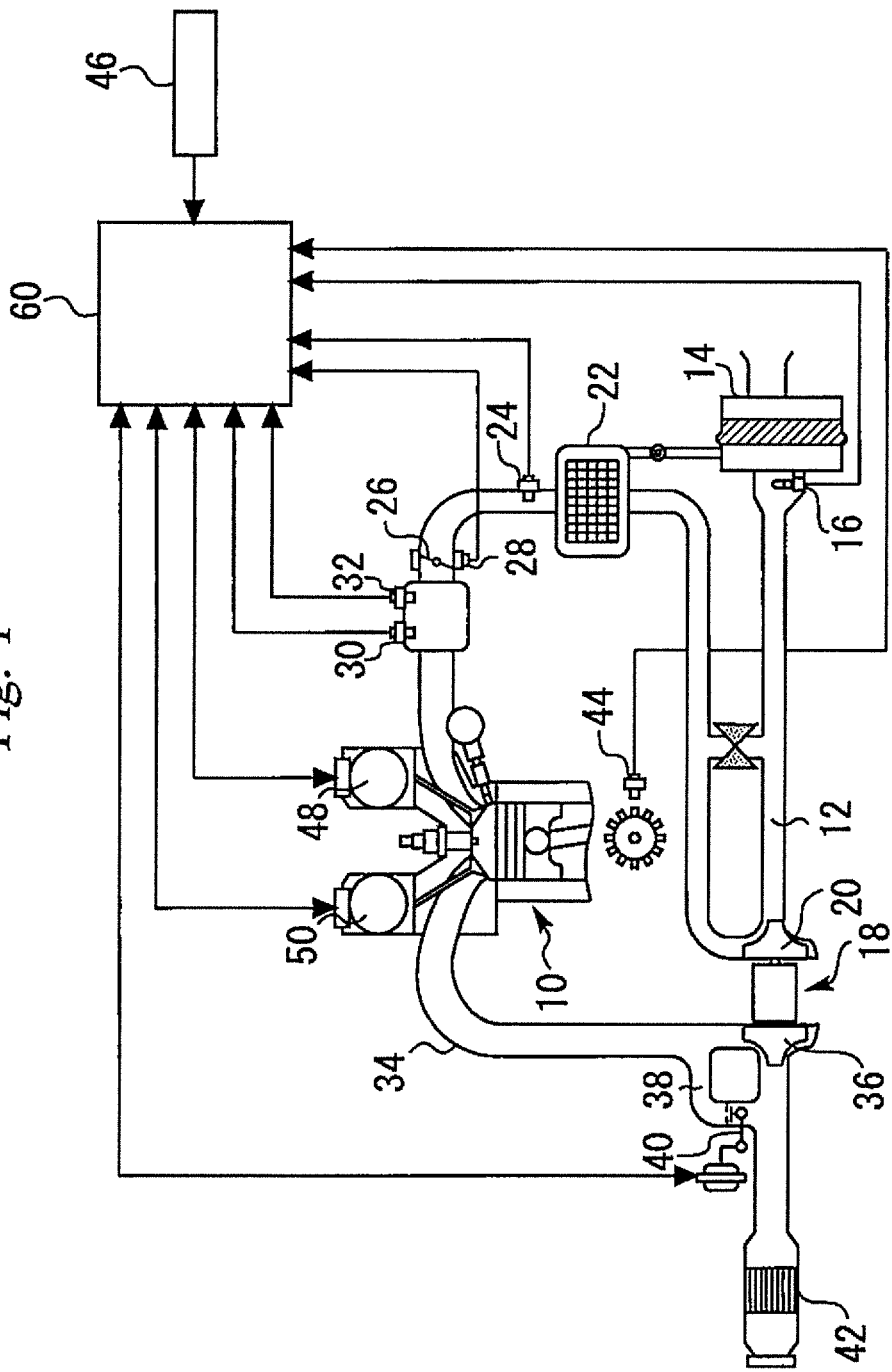
FIG. 1 is a schematic diagram showing a configuration of an internal combustion engine controlled by a controller according to this embodiment.

FIG. 1 is a schematic diagram showing a configuration of an internal combustion engine controlled by a controller according to this embodiment. An internal combustion engine 10 shown in FIG. 1 is a turbocharged engine configured to be capable of switching between a stoichiometric operation and a lean operation depending on the operational condition. In the stoichiometric operation, fuel combustion occurs at an air-fuel ratio close to a theoretical air-fuel ratio. In the lean operation, fuel combustion occurs at an air-fuel ratio leaner than the theoretical air-fuel ratio. The number and arrangement of cylinders of the internal combustion engine 10 are not particularly limited.

An air cleaner 14 is provided at the most upstream part of an intake channel 12 of the internal combustion engine 10. An air flowmeter 16 that detects an intake air amount GA and an intake air temperature Ta is provided downstream of the air cleaner 14. A compressor 20 for a turbocharger 18 and an intercooler 22 that cools an intake air compressed by the compressor 20 are provided downstream of the air flowmeter 16. A throttle valve 26 and a turbocharging pressure sensor 24 that detects a pressure Pcmp (referred to as a turbocharging pressure hereinafter) in the intake channel upstream of the throttle valve 26 are provided downstream of the intercooler 22. A throttle opening sensor 28 that detects the throttle opening is provided downstream of the turbocharging pressure sensor 24. An intake pipe pressure sensor 30 that detects a pressure Pm (referred to as an intake pipe pressure hereinafter) in the intake channel downstream of the throttle valve 26 and a temperature sensor 32 that detects a temperature Tm (referred to as an intake pipe temperature hereinafter) in the intake channel downstream of the throttle valve 26 are provided downstream of the throttle valve 26.

A turbine 36 coupled to the compressor 20 is provided in an exhaust channel 34 of the internal combustion engine 10. The turbocharger 18 is configured to use exhaust energy to rotate the turbine 36, thereby driving the compressor 20 to compress the intake air. In the exhaust channel 34, a bypass channel 38 that bypasses the turbine 36 is provided. A waist gate valve (WGV) 40 that opens and closes the bypass channel 38 is provided in the middle of the bypass channel 38. The WGV 40 is a control valve that is driven by a negative pressure type valve actuator but may also be driven by an electric actuator. A catalyst 42 that purifies an exhaust gas is provided downstream of the turbine 36.

The controller according to this embodiment is implemented as a part of the functionality of an electronic control unit (ECU) 60 that controls the internal combustion engine 10. The ECU 60 includes at least an input/output interface, a memory and a CPU. The input/output interface is provided to capture sensor signals from various kinds of sensors attached to the internal combustion engine 10 and a vehicle and to output an operation signals to actuators in the internal combustion engine 10. Sensors from which the ECU 60 captures signals include the air flowmeter 16, the turbocharging pressure sensor 24 and the throttle opening sensor 28 described above as well as a crank angle sensor 44 that detects an engine speed NE and an accelerator opening sensor 46 that detects an accelerator opening, for example. Actuators to which the ECU 60 outputs an operation signal include the throttle valve 26 and the WGV 40 described above as well as an intake variable valve mechanism 48 that drives an intake valve and an exhaust variable valve mechanism 50 that drives an exhaust valve, for example. The memory stores various kinds of control programs, control maps or the like for controlling the internal combustion engine 10. The CPU reads a control program or the like from the memory, executes the control program or the like and generates an operation signal based on a captured sensor signal.

In this embodiment, the control maps stored in the memory in the ECU 60 include an operation region map, a fully-closed WGV turbocharging pressure map, an a/b value map, and a KL-TQ map.

Figure 2:
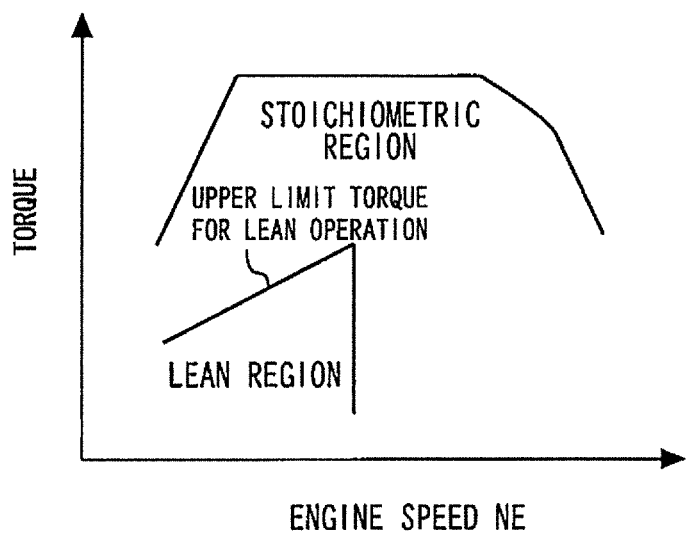
FIG. 2 is a diagram showing an example of the operation region map.

The operation region map is a map used in a control of switching the operation mode of the internal combustion engine 10 depending on the operational condition of the internal combustion engine 10. FIG. 2 is a diagram showing an example of the operation region map. The operation region map defines a stoichiometric region and a lean region in association with the operational condition of the internal combustion engine 10 or, more specifically, the engine toque and the engine speed NE. The "upper limit torque for lean operation" shown in FIG. 2 corresponds to a boundary between the stoichiometric region and the lean region. This boundary is set by plotting the maximum torque value with respect to the engine speed NE.

Figure 3:
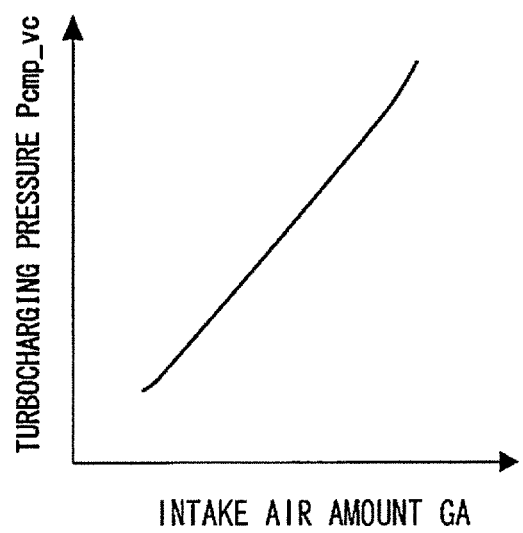
FIG. 3 is a diagram showing an example of the fully-closed WGV turbocharging pressure map.

The fully-closed WGV turbocharging pressure map is a map that defines a relationship between the intake air amount GA and fuel injection amount and the turbocharging pressure Pcmp at the time when the WGV is fully closed. FIG. 3 is a diagram showing an example of the fully-closed WGV turbocharging pressure map. The fully-closed WGV turbocharging pressure map is a map that is set with respect to the air-fuel ratio and shows an approximate relationship between the turbocharging pressure at the time when the WGV is fully closed (fully-closed WGV turbocharging pressure) Pcmp_vc and the intake air amount GA on the assumption that, given the constant air-fuel ratio, the exhaust energy is substantially equal to the intake air amount GA.

Figure 4A:
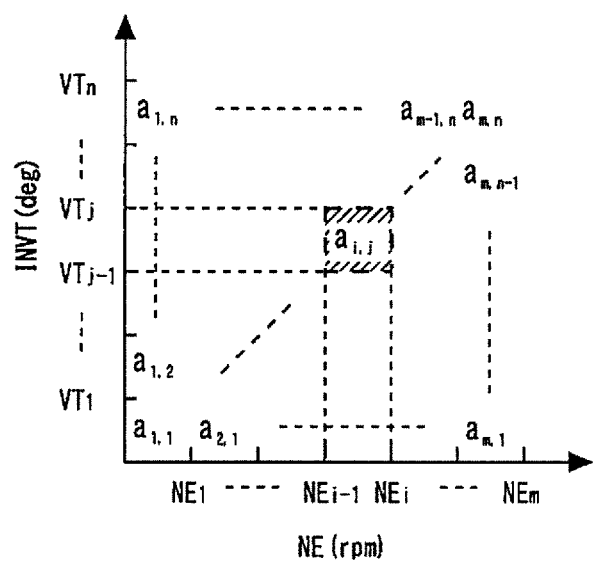
Figure 4B:
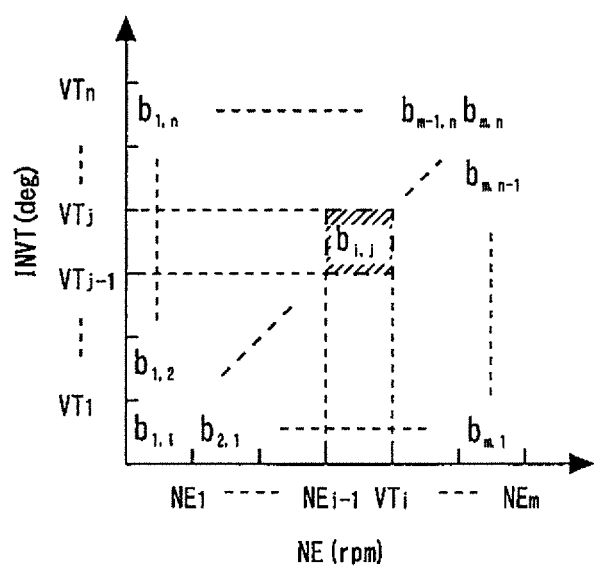
FIG. 4B shows a map that defines a relationship between the engines speed NE and valve opening time INVT and the value b.

The a/b value map is a four dimensional map that defines values of coefficient a and b of a model formula (mc=Ta/Tm*(a*Pm−b)) of an intake valve model that expresses a relationship between the flow rate of air flowing into a cylinder of the internal combustion engine in a unit time (in-cylinder intake air flow rate mc) and the intake pipe pressure Pm in association with the engine speed NE, an intake valve opening time INVT, an exhaust valve opening time EXVT and the turbocharging pressure Pcmp. FIGS. 4A and 4B are diagrams showing examples of the value a/b map. FIG. 4A shows a map that defines a relationship between the engine speed NE and valve opening time INVT and the value a, and FIG. 4B shows a map that defines a relationship between the engines speed NE and valve opening time INVT and the value b. As shown in FIGS. 4A and 4B, the engine speed NE and the valve opening time INVT are sectioned at regular intervals, and the values a and b are set for each of the sections. For example, in FIGS. 4A and 4B, regions $a_{i,j}$ and $b_{i,j}$ show the values of the coefficients a and b, respectively, at the time when the engine speed NE lies between $NE_{i-1}$ and $NE_i$ and the valve opening time INVT lies between $VT_{j-1}$ and $VT_j$. The maps shown in FIGS. 4A and 4B are based on the assumption that the turbocharging pressure Pcmp and the valve opening time EXVT are constant. In actual, however, maps like those shown in FIGS. 4A and 4B are set for different turbocharging pressures Pcmp and different valve opening timings EXVT.

Figure 5:
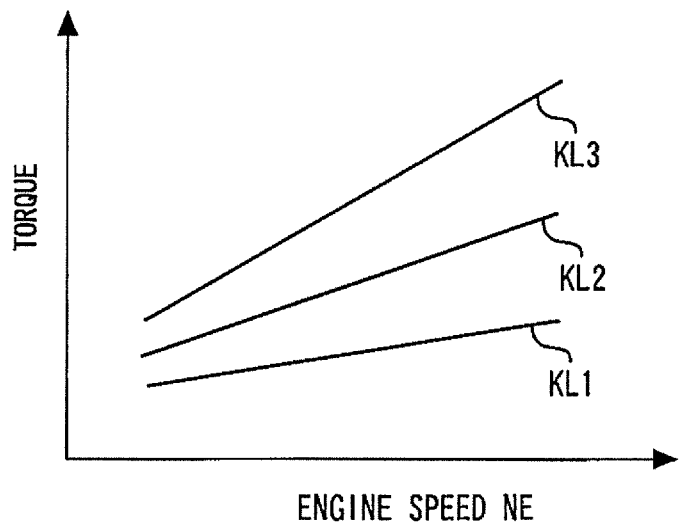
FIG. 5 is a diagram showing an example of the KL-TQ map.

The KL-TQ map is a map that defines a relationship between an in-cylinder air charge rate KL and the engine torque. FIG. 5 is a diagram showing an example of the KL-TQ map. The KL-TQ map defines a relationship between the in-cylinder air charge rate KL and the engine torque in association with the engine sped NE.

[Characteristics of Embodiment]

Figure 6:
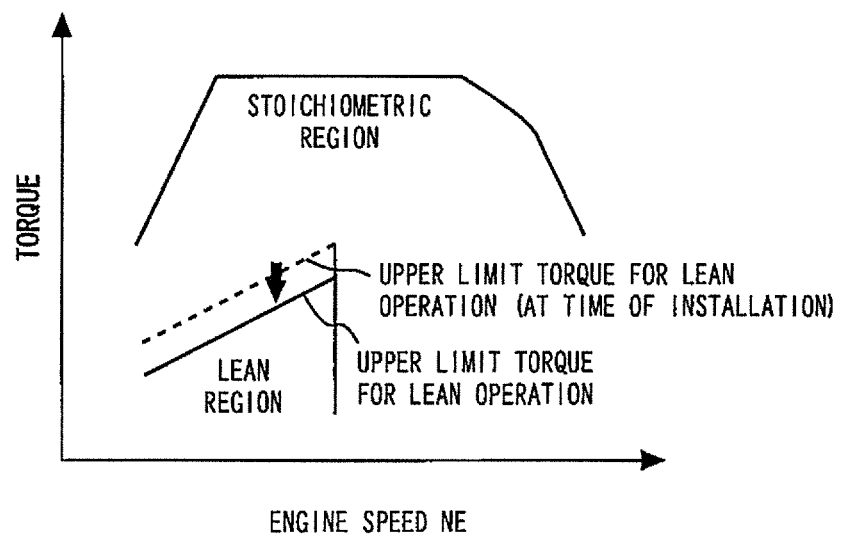
FIG. 6 is a diagram illustrating a change in the upper limit torque.

As described above, the maximum torque value decreases because of various factors including, such as deposit formation. The upper limit torque for lean operation shown by the solid line in FIG. 6 virtually shows the upper limit torque for lean operation after aging. The upper limit torque for lean operation shown by the solid line is shifted toward lower torques compared with the upper limit torque for lean operation at the time of installation of the ECU shown by the dashed line in the drawing. If the upper limit torque for lean operation is shifted toward lower torques as described above, the lean region in FIG. 6 shrinks, and the stoichiometric region expands accordingly.

According to this embodiment, the boundary between the stoichiometric region and the lean region is corrected toward lower torques (to the side of the lean region) by learning based on the turbocharging pressure Pcmp obtained from the turbocharging pressure sensor 24 when a correction permission condition is satisfied that the internal combustion engine 10 is in the lean operation, and the WGV 40 is fully closed. The turbocharging pressure Pcmp obtained from the turbocharging pressure sensor 24 when the correction permission condition is satisfied is equal to the turbocharging pressure Pcmp required to achieve the actual maximum value of the engine torque output when the internal combustion engine 10 is in the lean operation with the throttles valve fully opened, that is, the engine torque shown on the actual boundary. Therefore, the learning based on the turbocharging pressure Pcmp obtained from the turbocharging pressure sensor 24 when the correction permission condition is satisfied can bring the boundary between the stoichiometric region and the lean region close to the actual boundary. Thus, the problem that the engine torque at the time of installation of the ECU cannot be output because of various factors can be suppressed, and the continuity of engine torque can be ensured.

According to this embodiment, when the WGV 40 is fully closed to correct the boundary, the throttle valve 26 is concurrently operated to adjust the intake pipe pressure Pm. Such a throttle operation is performed to prevent the full closure of the WGV 40 from causing the turbocharging pressure Pcmp to increase and an engine torque higher than a target value (target torque) to be disadvantageously output. According to this embodiment, the control maps stored in the memory in the ECU 60 include a map that defines a relationship between the turbocharging pressure Pcmp and intake pipe pressure Pm and the throttle opening.

[Specific Process]

Figure 7:
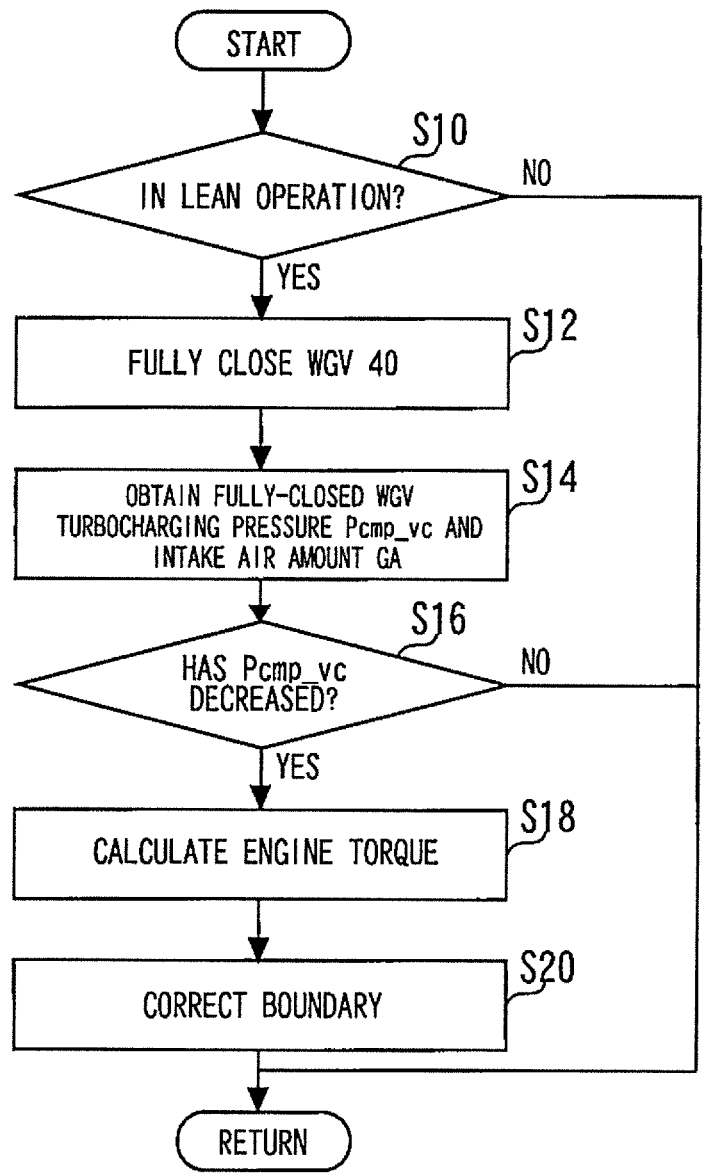
FIG. 7 is a flowchart for illustrating a learning operation performed by the ECU in this embodiment.

FIG. 7 is a flowchart for illustrating a learning operation performed by the ECU 60 in this embodiment. The routine shown in FIG. 7 is repeated every certain crank angle during operation of the internal combustion engine 10. In the routine shown in FIG. 7, it is first determined whether the operational state of the internal combustion engine 10 lies in the lean region or not (step S10). The processing of this step is performed using the operation region map shown in FIG. 2 based on the target torque calculated from the accelerator opening and the engine speed NE. If it is determined that the operation state of the internal combustion engine 10 lies in the stoichiometric region, this routine ends.

If it is determined in step S10 that the operation state of the internal combustion engine 10 lies in the lean region, the WGV 40 is fully closed (step S12), and the fully-closed WGV turbocharging pressure Pcmp_vc and the intake air amount GA are obtained (step S14). The detection value of the turbocharging pressure sensor 24 is used as the fully-closed WGV turbocharging pressure Pcmp_vc, and the detection value of the air flowmeter 16 is used as the intake air amount GA.

It is then determined whether the fully-closed WGV turbocharging pressure Pcmp_vc has decreased or not (step S16). The processing of this step begins with determining the map value of the fully-closed WGV turbocharging pressure Pcmp_vc from the detection value of the intake air amount GA obtained in step S14 and the fully-closed WGV turbocharging pressure map shown in FIG. 3. The determined map value is then compared with the detection value of the fully-closed turbocharging pressure Pcmp_vc obtained in step S14. If the difference between the detection value of the fully-closed turbocharging pressure Pcmp_vc and the map value is equal to or greater than a threshold, it is determined that the maximum torque value has decreased, and the process proceeds to step S18 and the following steps. Otherwise, it is determined that no correction of the boundary is needed, and this routine ends.

Figure 8:
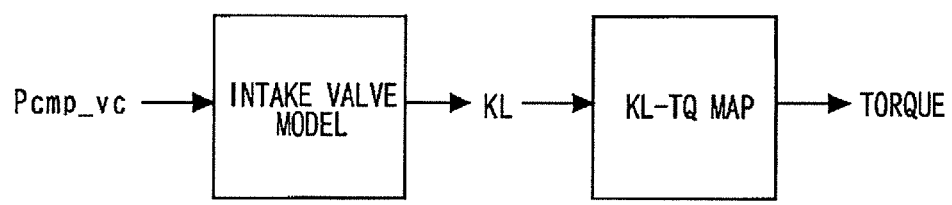
FIG. 8 is a diagram illustrating a processing in step S18 in FIG. 7.

In step S18, the engine torque that corresponds to the detection value of the fully-closed WGV turbocharging pressure Pcmp_vc is calculated. The processing of this step will be described in detail with reference to FIG. 8. In the processing of this step, the in-cylinder air charge rate KL at the time of processing of step S14 is calculated based on the detection value of the fully-closed WGV turbocharging pressure Pcmp_vc and the intake valve model, and the engine torque is calculated from the calculated in-cylinder air charge rate KL and the KL-TQ map described above with reference to FIG. 5. Specifically, the in-cylinder air charge rate KL is calculated as follows. The detection value of the fully-closed WGV turbocharging pressure Pcmp_vc obtained in step S14 as well as the engine speed NE, the valve opening times INVT and EXVT at the time of processing of step S14 are applied to the value a/b maps to determine the values of the coefficients a and b. The parameters (intake air temperature Ta, intake pipe temperature Tm and intake pipe pressure Pm) of the model formula of the intake valve model including the coefficients a and b are applied to the model formula to calculate the in-cylinder intake air flow rate mc. Furthermore, the in-cylinder air charge rate KL is calculated from the calculated in-cylinder intake air flow rate mc. Since the in-cylinder intake air flow rate mc and the in-cylinder air charge rate KL are in proportion to each other, the in-cylinder air charge rate KL can be calculated by multiplying the in-cylinder intake air flow rate mc by a predetermined proportionality factor. The calculated in-cylinder air charge rate KL is applied to the KL-TQ map described above with reference to FIG. 5 to calculate the learning value of the engine torque.

In step S20, the boundary is corrected toward lower torques. Specifically, the boundary is corrected to pass through an operation point defined by the learning value of the engine torque calculated in step S18 and the engine speed NE at the time of processing of step S14.

According to the routine shown in FIG. 7 described above, the boundary between the stoichiometric region and the lean region can be corrected to the actual boundary using the learning value of the engine torque calculated from the detection value of the fully-closed WGV turbocharging pressure Pcmp_vc obtained when the correction permission conditions is satisfied, the intake valve model and the KL-TQ map described above with reference to FIG. 5. Therefore, the problem that the engine torque at the time of installation cannot be output because of various factors can be solved, and the continuity of engine torque can be ensured.

In the embodiment described above, to calculate the learning value of the engine torque from the detection value of the fully-closed WGV turbocharging pressure Pcmp_vc, the model formula of the intake valve model, the value a/b maps shown in FIGS. 4A and 4B and the KL-TQ map described with reference to FIG. 5 are used. However, the model formula of the intake valve model, the value a/b maps shown in FIGS. 4A and 4B and the KL-TQ map shown in FIG. 5 are given as examples of the model formulas and maps used to calculate the engine torque from the detection value of the fully-closed WGV turbocharging pressure Pcmp_vc, and any other model formula or map can be used as far as it is based on the rule that defines the relationship between the turbocharging pressure Pcmp and the engine torque.

In the embodiment described above, steps S10 and S12 shown in FIG. 7 are performed in this order. However, the processings of steps S10 and S12 are processings for checking whether the prerequisite for performing the processings in step S14 and the following steps is satisfied or not, and therefore, the processings of steps S10 and S12 may be performed in the reverse order. In short, as far as the operation state of the internal combustion engine 10 identified based on the operation region map shown in FIG. 2 lies in the lean region, and the WGV 40 is fully closed, it can be determined that the correction permission condition for the boundary is satisfied, and the processings of step S14 and the following steps can be performed to correct the boundary as in the embodiment described above.

In the embodiment described above, the processings of step S18 and the following steps in FIG. 7 are performed after it is determined in step S16 in FIG. 7 that the fully-closed WGV turbocharging pressure Pcmp_vc has decreased. However, the processing of step S16 in FIG. 7 may be skipped.

If the processing of step S16 in FIG. 7 is skipped, the advantage described below can be provided. The embodiment has been described on the assumption that the maximum torque value decreases because of various factors. However, the maximum torque value at the time of installation of the ECU may contain an instrumental variation. If the maximum torque value contain an instrumental variation, the maximum torque value at the time of installation of the ECU may be higher than the maximum value of the engine torque actually output when the internal combustion engine 10 is in the lean operation with the throttle valve 26 fully opened. In such a case, if the processing of step S16 in FIG. 7 is skipped, the boundary can be corrected toward higher torques (to the side of the rich region).

The memory in the ECU 60 in the embodiment described above corresponds to the "storage means" in the first aspect of the present invention described above, the WGV 40 in the embodiment described above corresponds to the "control valve" in the first aspect of the present invention described above, the turbocharging pressure sensor 24 in the embodiment described above corresponds to the "turbocharging pressure detecting means" in the first aspect of the present invention described above, and the air flowmeter 16 in the embodiment described above corresponds to the "intake air amount detecting means" in the second aspect of the present invention described above.

The "boundary correcting means" in the first aspect of the present invention described above is implemented by the ECU 60 performing the series of processings of the routine shown in FIG. 7 in the embodiment described above.

The invention claimed is:

1. A control apparatus for an internal combustion engine provided with a turbocharger, the control apparatus switching operation of the internal combustion engine between a stoichiometric operation, in which fuel combustion occurs at a first air-fuel ratio, and a lean operation, in which fuel combustion occurs at a second air-fuel ratio leaner than the first air-fuel ratio, based on an operation region map that defines, in association with an engine torque, a stoichiometric region in which the stoichiometric operation occurs and a lean region separated from the stoichiometric region by a predetermined boundary in which the lean operation occurs, and on a target value of an engine torque, the control apparatus comprising:
　　storage means configured to store a rule that defines a relationship between a turbocharging pressure and the engine torque;
　　a control valve that opens and closes a bypass channel that bypasses an exhaust turbine of the turbocharger;
　　turbocharging pressure detecting means configured to detect the turbocharging pressure of the turbocharger; and
　　boundary correcting means configured to correct the predetermined boundary based on the engine torque calculated using the turbocharging pressure detected by the turbocharging pressure detecting means and the rule when a predetermined correction permission condition is satisfied that an operation region identified based on the target value calculated from an accelerator opening and the operation region map lies in the lean region, and the bypass channel is closed by the control valve.

2. The control apparatus for an internal combustion engine according to claim 1, further comprising:
　　intake air amount detecting means configured to detect an intake air amount,
　　wherein the storage means is configured to store a turbocharging pressure map that defines a relationship between the intake air amount and the turbocharging pressure, and
　　the boundary correcting means is configured to correct the predetermined boundary to the side of the lean region based on the calculated engine torque when the predetermined correction permission condition is satisfied, and the turbocharging pressure detected by the turbocharging pressure detecting means is lower than the turbocharging pressure calculated using the intake air amount detected by the intake air amount detecting means and the turbocharging pressure map.

3. A control apparatus for an internal combustion engine provided with a turbocharger, the control apparatus comprising:
　　a control valve configured to open and close a bypass channel that bypasses an exhaust turbine of the turbocharger;
　　a turbocharging pressure sensor configured to detect turbocharging pressure of the turbocharger; and
　　an electronic control unit programmed to:
　　　　(i) store an operation region map that defines, in association with an engine torque, a stoichiometric region in which a stoichiometric operation occurs and a lean region in which a lean operation occurs, the lean region separated from the stoichiometric region by a predetermined boundary, the stoichiometric operation being an operation in which fuel combustion occurs at a first air-fuel ratio, the lean operation being an operation in which fuel combustion occurs at a second air-fuel ratio leaner than the first air-fuel ratio,
　　　　(ii) switch operation of the internal combustion engine between the stoichiometric operation and the lean operation based on the operation region map and on a target value of an engine torque,
　　　　(iii) store a rule that defines a relationship between the turbocharging pressure and the engine torque, and
　　　　(iv) correct the predetermined boundary based on the engine torque calculated using the turbocharging pressure and the rule when a predetermined correction permission condition is satisfied that an operation region identified based on the target value calculated from an accelerator opening and the operation region map lies in the lean region, and the bypass channel is closed by the control valve.

4. The control apparatus according to claim 3, further comprising an airflow meter configured to detect an intake air amount, and wherein
　　the electronic control unit is programmed to:
　　　　(v) store a turbocharging pressure map that defines a relationship between an intake air amount and the turbocharging pressure, and
　　　　(vi) correct the predetermined boundary to the side of the lean region based on the calculated engine torque when the predetermined correction permission condition is satisfied, and the turbocharging pressure is lower than the turbocharging pressure calculated using the detected intake air amount and the turbocharging pressure map.

* * * * *